(12) United States Patent
Bristow

(10) Patent No.: US 6,922,449 B1
(45) Date of Patent: Jul. 26, 2005

(54) RADIO RECEIVER

(75) Inventor: Robert Owen Bristow, Basingstoke (GB)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/719,632

(22) PCT Filed: Jun. 17, 1999

(86) PCT No.: PCT/EP99/04217
§ 371 (c)(1),
(2), (4) Date: Dec. 15, 2000

(87) PCT Pub. No.: WO99/66646
PCT Pub. Date: Dec. 23, 1999

(30) Foreign Application Priority Data

Jun. 18, 1998 (GB) .............................. 9813212

(51) Int. Cl.[7] .............................. H04B 1/69; H04B 00/00
(52) U.S. Cl. ...................................... 375/316; 455/131
(58) Field of Search ................... 375/316, 75; 455/131; 341/122

(56) References Cited

U.S. PATENT DOCUMENTS

| 4,034,298 A | | 7/1977 | McFadyen et al. | |
|---|---|---|---|---|
| 4,050,022 A | | 9/1977 | McFadyen et al. | |
| 4,539,710 A | * | 9/1985 | Dinsmore | ................... 455/134 |
| 4,584,716 A | | 4/1986 | Drentea | |
| 4,811,362 A | * | 3/1989 | Yester et al. | ................ 375/316 |
| 4,910,521 A | | 3/1990 | Mellon | |
| 5,280,636 A | * | 1/1994 | Kelley et al. | ............... 455/131 |
| 5,621,730 A | | 4/1997 | Kelley | |
| 6,005,506 A | * | 12/1999 | Bazarjani et al. | ........... 341/143 |
| 6,061,385 A | * | 5/2000 | Ostman | ..................... 375/130 |
| 6,072,996 A | * | 6/2000 | Smith | ..................... 455/189.1 |
| 6,157,682 A | * | 12/2000 | Oberhammer | .............. 375/316 |
| 6,265,998 B1 | * | 7/2001 | Banu et al. | ................. 341/122 |

FOREIGN PATENT DOCUMENTS

| EP | 555132 | 12/1981 |
|---|---|---|
| EP | 0 651 522 | 5/1995 |
| EP | 0 772 304 | 5/1997 |
| EP | 778678 | 6/1997 |
| EP | 0 784 381 | 7/1997 |
| WO | WO 97/05705 | 2/1997 |

* cited by examiner

*Primary Examiner*—Stephen Chin
*Assistant Examiner*—Cicely Ware
(74) *Attorney, Agent, or Firm*—Potomac Patent Group PLLC

(57) ABSTRACT

A radio receiver architecture is disclosed which has first and second front end circuits optimized for reception in two frequency bands. Each front end circuit includes a mixer for downconverting received signals to a respective intermediate frequency. Signals from the two front end circuits are passed to a single analog-to-digital converter. The sampling rate of the analog-to-digital converter and the intermediate frequencies are chosen such that the received signals appear at the same point in different teeth of the alias response of the analog-to-digital converter.

16 Claims, 2 Drawing Sheets

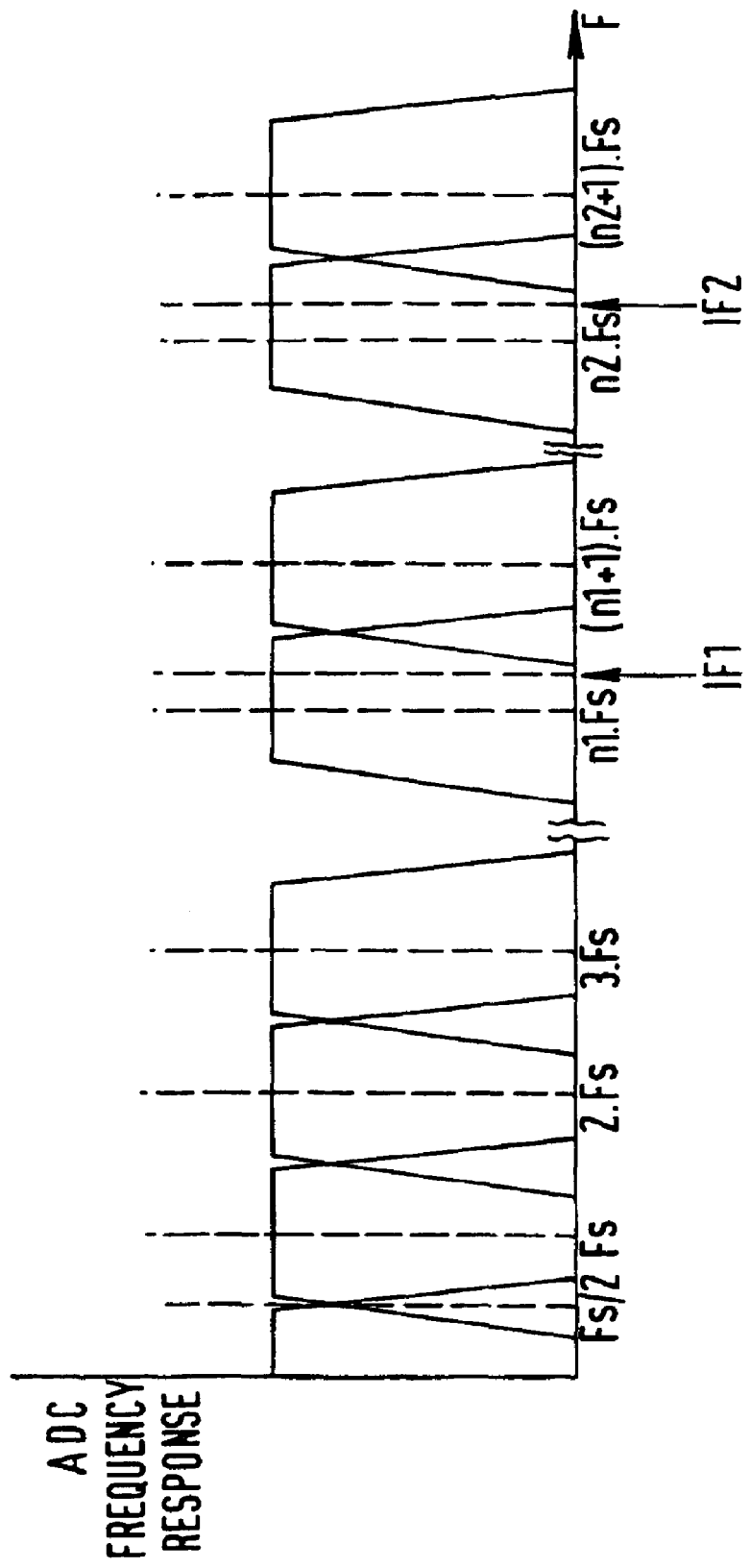

RADIO RECEIVER

TECHNICAL FIELD OF THE INVENTION

This invention relates to a radio receiver architecture, and in particular to an architecture which is suitable for use in a dual-band receiver.

BACKGROUND OF THE INVENTION

It is becoming a common requirement for portable communications devices, such as mobile phones, to be able to operate in two separate regions of the radio frequency spectrum. For example, it is becoming a common requirement for mobile phones that they should be able to operate at 900 MHz and at 1800 MHz. Such products are known as dual-band products. In the design of such dual-band products, one option is to duplicate the receiver circuitry. U.S. Pat. No. 4,584,716 shows a radio receiver, for receiving signals at two different frequencies, in which the receiver circuitry, including radio frequency amplifier, mixer for downconversion to an intermediate frequency, intermediate frequency filter, intermediate frequency amplifier, and analog-digital converter, is duplicated.

Clearly, it would be advantageous to avoid such duplication, to reduce the size and power consumption of the device. However, any changes for this reason must also take account of the fact that radio frequency components are typically optimised for use at one particular frequency band.

SUMMARY OF THE INVENTION

The present invention provides a radio architecture for use in a dual-band product. Circuitry is provided for receiving signals in two parts of the radio frequency spectrum, and the received signals are downconverted to respective intermediate frequencies. However, there is provided only a single analog to digital converter, which operates at a single sampling frequency.

The invention makes use of a known property of analog to digital converters, namely that they have alias responses, at multiples of the sampling frequency.

The intermediate frequencies, to which the received signals are downconverted, are selected such that they appear in the alias responses at different multiples of the sampling frequency.

This has the advantage that it is necessary to provide only one analog to digital converter in the receiver circuitry, while still allowing the choice of intermediate frequencies which can be close to optimal for the particular received frequency band.

BRIEF DESCRIPTION OF DRAWINGS

FIG. 2 is an illustration of the frequency response of an analog to digital converter, for use in explaining the operation of the circuit of FIG. 1.

DETAILED DESCRIPTION OF PREFERRED EMBODIMENTS

Figure 1:
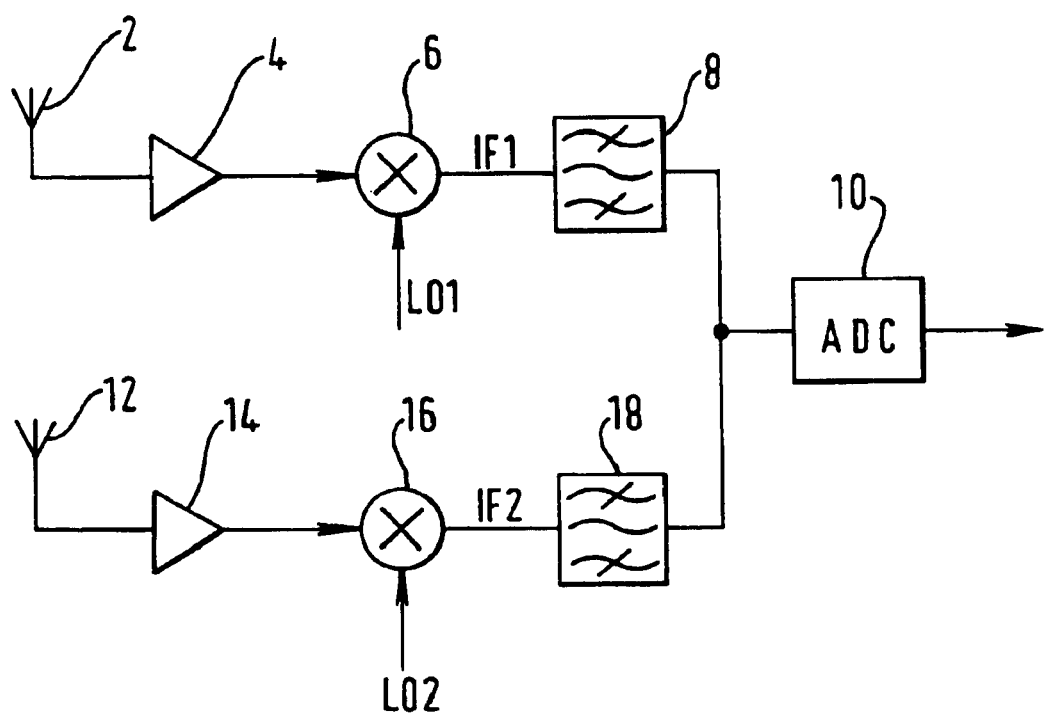
FIG. 1 is a block schematic diagram of a receiver architecture in accordance with the invention.

FIG. 1 is a block schematic diagram of a radio receiver architecture in accordance with the invention. As described herein, the architecture is suitable for use in a dual-band GSM mobile phone, operating at other frequencies in the region of 900 MHz and 1800 MHZ respectively. However, it will be appreciated that the invention is applicable to such products operating at other frequency bands, and indeed to other devices which receive radio frequency signals in two distinct parts of the radio frequency spectrum.

The circuit of FIG. 1 includes a first antenna 2, optimised for receiving signals at 900 MHz, and a first RF amplifier 4, for amplifying the received signals. The amplified received signals are passed to a mixer 6, which also receives a first local oscillator frequency LO1, and downconverts the amplified received signals to a first intermediate frequency IF1. The whole of this front-end circuit can be optimised for reception at 900 MHz. The downconverted intermediate frequency signals are passed to a first band-pass filter 8, and then to an analog-digital converter ADC 10, operating at a sampling frequency Fs. The output digital signals are then passed to processing circuitry in a conventional way.

In a mobile phone as described herein, in which the two frequency bands of operation are designed to receive signals transmitted in the conventional GSM format, the ADC 10 might advantageously sample the signals at the GSM clock rate of 13 MHz.

The receiver architecture of FIG. 1 further includes a second antenna 12, optimised for receiving signals at 1800 MHz, and a second RF amplifier 14, for amplifying signals received by the antenna 12.

The architecture further includes a second mixer 16, which also receives a second local oscillator signal LO2, for downconverting the signals received by the second antenna 12 to a second intermediate frequency IF2. This second front-end circuit can be optimised for reception at 1800 MHz.

The downconverted signals at the second intermediate frequency IF2 are passed to a second band-pass filter 18, and the filtered signals are also passed to the same ADC 10.

Crucial to the operation of the analog-digital converter 10 is the relationship between its sampling frequency Fs and the frequencies of the received signals. The frequency response of an analog-digital converter is shown in FIG. 2, for the purposes of explanation of this relationship.

Often, the sampling frequency Fs of the ADC is chosen to be sufficiently high that all of the received signals have a frequency which is less than Fs/2. This is termed Nyquist sampling, and means that all of the signals within that frequency range can be satisfactorily sampled.

However, the ADC also produces alias responses, to signals at higher frequencies. Thus, input signals at the sampling frequency Fs itself will appear to the ADC to have zero frequency, and signals at Fs±Fx (where Fx is small compared to Fs) will both appear to the ADC to be at the frequency Fx.

Where an input signal has a frequency range from zero to, say, 1.25 Fs, then this is a serious problem, because the alias response means that, in the ADC output signal, it is not possible to distinguish between input signals at 0.2 Fs, 0.8 Fs and 1.2 Fs.

Moreover, as FIG. 2 shows, there is a similar alias response around each multiple of the sampling frequency Fs. The frequency response shown in FIG. 2 is known as a comb response.

However, where the input signal lies within a known, relatively narrow frequency band, a technique known as sub-Nyquist sampling can take advantage of this alias response.

More specifically, if a receiver circuit can be designed such that it is known that an ADC input signal will appear in a particular region of the ADC frequency response, then the aliasing property of the ADC will mean that the signal is effectively converted down to a frequency which is less than Fs/2.

In accordance with the present invention, the dual-band input signals are downconverted to respective intermediate frequencies which appear in different parts of the alias response of the ADC, but which are nevertheless converted down to similar frequencies.

More specifically, it is advantageous to arrange for an ADC input signal to have a frequency centered at or close to (N±0.25)Fs, because this allows the signals to vary in the frequency range from N.Fs to (N±0.05)Fs, without causing further aliasing problems. In accordance with the invention, therefore, the ADC input signals can be arranged to appear in two different such regions of the frequency response, namely with different integer values of N.

This is illustrated in more detail in FIG. 2, which shows the first intermediate frequency IF1 appearing at (n1+0.25) Fs, and the second intermediate frequency IF2 appearing at (n2+0.25)Fs, with n1 and n2 being different integers. The difference (IF2−IF1) between the two intermediate frequencies is n3.Fs where n3 is an integer.

More particularly, in the case of the dual-band receiver shown in FIG. 1, receiving input signals at 900 MHz and 1800 MHz, the optimal intermediate frequency for the 900 MHz signals is in the region of 100 MHz, while the optimal intermediate frequency for signals received at 1800 MHz is in the region of 200 MHz.

Therefore, if the ADC 10 has a sampling rate of 13 MHz, as discussed previously, the local oscillator signal LO1 can be chosen to give an intermediate frequency IF1 of 94.25 MHz (i.e. 7.25×13 MHz) for the signals received at 900 MHz, and the local oscillator frequency LO2 can be chosen to give an intermediate frequency IF2 of 198.25 MHz (i.e. 15.25×13 MHz) for the signals received at 1800 MHz. Thus, the difference between the two intermediate frequencies is an integer multiple of the ADC sampling frequency.

Both signals will therefore appear in the output of the ADC10 centered on 3.25 MHz, namely one quarter of the sampling frequency.

There is therefore disclosed an architecture which allows downconversion of signals received by a dual-band receiver, without requiring duplication of the analog-digital converter.

Although the invention has been described herein with reference to a dual band receiver, in which two intermediate frequency signals are effectively downconverted in the analog-digital converter, it will be appreciated that the invention is also applicable to architectures in which the downconversion of any larger number of intermediate frequency signals is achieved in the same way.

What is claimed is:

1. A radio receiver, comprising:
   first receiver front-end circuitry, for receiving signals in a first received frequency band, the first receiver front-end circuitry including a first mixer and means for supplying a first local oscillator signal thereto for downconverting signals in the first received frequency band to a band at a first intermediate frequency IF1;
   second receiver front-end circuitry, for receiving signals in a second received frequency band, the second receiver front-end circuitry including a second mixer and means for supplying a second local oscillator signal thereto for downconverting signals in the second received frequency band to a band at a second intermediate frequency IF2; and
   an analog-digital converter, for sampling downconverted signals received from both the first receiver front-end circuitry and the second receiver front-end circuitry at a predetermined sampling rate Fs;
   the first and second local oscillator frequencies being selected such that the intermediate frequencies are given by:

$IF1 = Fs*(N1 \pm x)$, and $IF2 = Fs*(N2 \pm y)$, wherein N1 and N2 are respective different integers, $0 < x < \frac{1}{2}$, and $0 < y < \frac{1}{2}$.

2. A radio receiver as claimed in claim 1, wherein x is approximately equal to $\frac{1}{4}$.

3. A radio receiver as claimed in claim 1, wherein y is approximately equal to $\frac{1}{4}$.

4. A radio receiver as claimed in claim 1, wherein x=y.

5. A radio receiver as claimed in claim 1, further comprising:
   a first band-pass filter, for allowing signals at the first intermediate frequency to pass from the first mixer to the analog-digital converter, and a second band-pass filter, for allowing signals at the second intermediate frequency to pass from the second mixer to the analog-digital converter.

6. A radio receiver, comprising:
   first receiver front-end circuitry, including a first mixer for downconverting a signal received at a first received frequency to a first intermediate frequency;
   second receiver front-end circuitry, including a second mixer for downconverting a signal received at a second received frequency to a second intermediate frequency; and
   an analog-digital converter, for sampling downconverted signals received from both the first receiver front-end circuitry and the second receiver front-end circuitry at a predetermined sampling rate, and having an alias response whereby signals at multiples of the sampling rate appear in the output thereof;
   wherein the first and second intermediate frequencies are each selected such that, on sampling by the analog-digital converter, the respective sampled signals appear at known points in the alias response thereof.

7. A radio receiver as claimed in claim 6, wherein the first and second intermediate frequencies are each selected such that, on sampling by the analog-digital converter, the respective sampled signals appear at the same points on different teeth of the alias response thereof.

8. A radio receiver as claimed in claim 1, operable in a first mode, in which downconverted signals from the first receiver front-end circuitry are passed to the analog-digital converter, and operable in a second mode, in which downconverted signals from the second receiver front-end circuitry are passed to the analog-digital converter.

9. A radio receiver as claimed in claim 6, operable in a first mode, in which downconverted signals from the first receiver front-end circuitry are passed to the analog-digital converter, and operable in a second mode, in which downconverted signals from the second receiver front-end circuitry are passed to the analog-digital converter.

10. A radio receiver as claimed in claim 1, wherein the first local oscillator frequency is selected such that the first intermediate frequency is given by:

$$IF1=Fs*(N1+x), \text{ and}$$

said band at said first intermediate frequency lies entirely within the range from Fs*N1 to Fs*(N1+½).

11. A radio receiver as claimed in claim 1, wherein the first local oscillator frequency is selected such that the first intermediate frequency is given by:

$$IF1=Fs*(N1-x), \text{ and}$$

said band at said first intermediate frequency lies entirely within the range from Fs*(N1-½) to Fs*N1.

12. A radio receiver as claimed in claim 1, wherein the second local oscillator frequency is selected such that the second intermediate frequency is given by:

$$IF2=Fs*(N2+x), \text{ and}$$

said band at said second intermediate frequency lies entirely within the range from Fs*N2 to Fs*(N2+½).

13. A radio receiver as claimed in claim 1, wherein the second local oscillator frequency is selected such that the second intermediate frequency is given by:

$$IF2=Fs*(N2-x), \text{ and}$$

said band at said second intermediate frequency lies entirely within the range from Fs*(N2-½) to Fs*N2.

14. A radio receiver as claimed in claim 6, wherein the first and second intermediate frequencies are each selected such that, on the sampling by the analog-digital converter, the signals received at the first and second received frequencies are each downconverted without further aliasing.

15. A multiple band radio receiver, comprising:

first receiver front-end circuitry, for receiving signals in a first received frequency band in a first operating mode, the first receiver front-end circuitry including a first mixer and means for supplying a first local oscillator signal thereto for downconverting signals in the first received frequency band to a band at a first intermediate frequency IF1;

second receiver front-end circuitry, for receiving signals in a second received frequency band in a second operating mode, the second receiver front-end circuitry including a second mixer and means for supplying a second local oscillator signal thereto for downconverting signals in the second received frequency band to a band at a second intermediate frequency IF2; and an analog-digital converter, for sampling downconverted signals received from both the first receiver front-end circuitry and the second receiver front-end circuitry at a predetermined sampling rate Fs;

the first and second local oscillator frequencies being selected such that the intermediate frequencies are given by:

$$IF1=Fs*(N1+x), \text{ and}$$

$$IF2=Fs*(N2\pm y),$$

wherein N1 and N2 are respective different integers, $$0<x<½, \text{ and}$$

$$0<y<½.$$

16. A multi-band radio receiver, comprising:

first receiver front-end circuitry, including a first mixer for downconverting a signal received at a first received frequency to a first intermediate frequency in a first operating mode;

second receiver front-end circuitry, including a second mixer for downconverting a signal received at a second received frequency to a second intermediate frequency in a second operating mode; and an analog-digital converter, for sampling downconverted signals received from both the first receiver front-end circuitry and the second receiver front-end circuitry at a predetermined sampling rate, and having an alias response whereby signals at multiples of the sampling rate appear in the output thereof;

wherein the first and second intermediate frequencies are each selected such that, on sampling by the analog-digital converter, the respective sampled signals appear at known points in the alias response thereof.

* * * * *

UNITED STATES PATENT AND TRADEMARK OFFICE
CERTIFICATE OF CORRECTION

PATENT NO. : 6,922,449 B1  
APPLICATION NO. : 09/719632  
DATED : July 26, 2005  
INVENTOR(S) : Robert Owen Bristow Page 1 of 1

It is certified that error appears in the above-identified patent and that said Letters Patent is hereby corrected as shown below:

Column 3, Line 13: Please change "(N±0.05)Fs" to --(N+0.5)Fs--

Col. 6, Claim 15, Line 23: Please change "IF1=Fs*(N1+x)" to --IF1=Fs*(N1±x)--

Signed and Sealed this

Eleventh Day of July, 2006

JON W. DUDAS  
*Director of the United States Patent and Trademark Office*